(12) United States Patent
Numata et al.

(10) Patent No.: US 9,434,024 B2
(45) Date of Patent: Sep. 6, 2016

(54) LASER CUTTING METHOD AND LASER CUTTING DEVICE

(71) Applicant: NISSAN TANAKA CORPORATION, Saitama (JP)

(72) Inventors: Shinji Numata, Saitama (JP); Hirotaka Kamikihara, Saitama (JP); Yoshimi Sano, Saitama (JP)

(73) Assignee: Nissan Tanaka Corporation, Saitama (JP)

( * ) Notice: Subject to any disclaimer, the term of this patent is extended or adjusted under 35 U.S.C. 154(b) by 326 days.

(21) Appl. No.: 14/350,064

(22) PCT Filed: Oct. 17, 2012

(86) PCT No.: PCT/JP2012/076823
§ 371 (c)(1),
(2) Date: Apr. 4, 2014

(87) PCT Pub. No.: WO2013/065484
PCT Pub. Date: May 10, 2013

(65) Prior Publication Data
US 2014/0246405 A1    Sep. 4, 2014

(30) Foreign Application Priority Data

Nov. 2, 2011   (JP) ................................. 2011-241464

(51) Int. Cl.
*B23K 26/08*    (2014.01)
*B23K 26/14*    (2014.01)
*B23K 26/38*    (2014.01)

(52) U.S. Cl.
CPC .......... *B23K 26/1405* (2013.01); *B23K 26/08* (2013.01); *B23K 26/0869* (2013.01); *B23K 26/0884* (2013.01); *B23K 26/14* (2013.01); *B23K 26/1435* (2013.01); *B23K 26/38* (2013.01)

(58) Field of Classification Search
CPC ... B23K 26/08; B23K 26/14; B23K 26/1435
USPC ........... 219/121.67, 121.72, 121.61, 121.62, 219/121.83
See application file for complete search history.

(56) References Cited

U.S. PATENT DOCUMENTS 4,550,241 A * 10/1985 Scott .................. B23K 26/1429
219/121.67
5,155,328 A    10/1992 Ikawa
(Continued)

FOREIGN PATENT DOCUMENTS

JP    A-03-210981    9/1991
JP    A-04-033788    2/1992
(Continued)

OTHER PUBLICATIONS

International Search Report in PCT/JP2012/076823 dated Dec. 25, 2012.
(Continued)

*Primary Examiner* — Samuel M Heinrich
(74) *Attorney, Agent, or Firm* — Nixon Peabody LLP; Khaled Shami

(57) ABSTRACT

A laser cutting device includes a control unit which sets a steady oxygen concentration, a moving speed of a laser nozzle and laser beam steady control conditions based on a material and a plate thickness of the workpiece, decreases the moving speed of the laser nozzle to a first setting speed when the laser nozzle arrives a first setting position in front of an end point of a cutting trajectory, and decreases a relative moving speed of the laser nozzle to a second setting speed by varying the oxygen concentration of the cutting gas and the control condition of the laser beam when the laser nozzle arrives at a second setting position.

4 Claims, 7 Drawing Sheets

(56) References Cited

U.S. PATENT DOCUMENTS

| | | | | |
|---|---|---|---|---|
| 5,585,018 | A | * | 12/1996 | Kanaoka ............ B23K 26/0626 |
| | | | | 219/121.61 |
| 5,688,418 | A | * | 11/1997 | Yoshiyasu ............ B23K 26/388 |
| | | | | 219/121.62 |
| 5,734,146 | A | * | 3/1998 | La Rocca ............ B23K 26/123 |
| | | | | 219/121.72 |

FOREIGN PATENT DOCUMENTS

| | | |
|---|---|---|
| JP | A-04-339588 | 11/1992 |
| JP | 6-665 A | 1/1994 |
| JP | A-07-284974 | 10/1995 |
| JP | 2749382 B2 | 5/1998 |
| JP | A-2001-334379 | 12/2001 |
| KR | 0158277 B1 | 1/1999 |
| WO | 89/07035 A1 | 8/1989 |
| WO | WO 94/21417 A1 | 9/1994 |
| WO | WO 2012/063668 A1 | 5/2012 |

OTHER PUBLICATIONS

Chinese Search Report for Chinese Application No. 201280052842.0, mailed Dec. 3, 2014, with partial English language translation, 9 pages.

Office Action in Korean Application No. 10-2014-7011203, dated Apr. 8, 2015.

* cited by examiner

LASER CUTTING METHOD AND LASER CUTTING DEVICE

CROSS REFERENCE TO RELATED APPLICATIONS

This application is the national stage of International Application No. PCT/JP2012/076823, filed Oct. 17, 2012, entitled, "Laser Cutting Method And Laser Cutting Device," which claims the benefit of priority of Japanese Patent Application No. 2011-241464, filed Nov. 2, 2011, the contents of which are incorporated herein by reference in their entirety.

TECHNICAL FIELD

The present invention relates to a laser cutting method and a laser cutting device capable of injecting a cutting gas and cutting a workpiece while radiating a laser beam to the workpiece.

BACKGROUND ART

In laser cutting, a cutting gas flows around a laser beam, a workpiece is melted by energy of the laser beam radiated to the workpiece and oxidation reaction energy between the workpiece and the cutting gas, and a melted metal is discharged by the kinetic energy of the cutting gas.

When the workpiece is cut by such laser cutting, an end point of the laser cutting may be set such that a laser nozzle is separated from the workpiece in a preset shape. However, for example, when oxygen is used as the cutting gas such as when cutting a soft steel material, depending on the cut shape or material and a surface state, an excessively wide range on the workpiece may reach a high temperature, and the workpiece may be excessively melted such that a desired shape in the vicinity of a cutting end point cannot be secured.

Here, in order to secure the desired shape in the vicinity of the end point of the laser cutting, for example, in general, the cutting is performed while a micro joint remains as shown in FIG. 5A. Otherwise, in general, a cutting relief as shown in FIGS. 5B to 5D is performed. Here, solid lines in FIGS. 5A to 5D show edge sections of kerfs, hatched circles show piercing holes, and broken lines and arrows on the broken lines show trajectories of the laser nozzle.

However, when the cutting is performed while the micro joint remains, the micro joint should be separately cut, and the number of cutting processes and the total cutting costs are increased. In this respect, for example, a technique of forming a small micro joint and improving machining efficiency is disclosed (for example, see Patent Literature 1).

Meanwhile, in the cutting relief, scratching is likely to occur in the vicinity of the end point of the cutting.

CITATION LIST

Patent Literature

[Patent Literature 1] Japanese Unexamined Patent Application, First Publication No. 2001-334379

SUMMARY OF INVENTION

Problem to be Solved by the Invention

FIGS. 6A to 6C are conceptual views showing states of the laser cutting in the vicinity of the cutting end point. In FIGS. 6A to 6C, upper sides show plan views, and lower sides shows longitudinal cross-sectional views taken along line T-T corresponding to the plan views. In FIGS. 6A to 6C, the reference character C shows a kerf, the reference character D shows a piercing hole, the reference character E shows a laser beam, the reference character G shows a cutting gas, the reference character W shows a workpiece, the reference character H shows a drag, and the reference character J shows a remaining margin.

For example, in the vicinity of the cutting end point, as shown in FIG. 6A, when the laser nozzle approaches a cutting termination section of an already formed kerf C as shown by an arrow, the remaining margin J between a cutting front and the already formed kerf is reduced, and heat from the cutting cannot easily escape.

Next, as shown in FIG. 6B, when the laser nozzle approaches the cutting termination section, a portion under the drag is rapidly heated due to a delay of the drag.

Further, as shown in FIG. 6C, when the laser nozzle approaches the cutting termination section, the remaining margin J is abruptly heated and severely melted by thermal energy. Scratching occurs due to the severe melting.

Furthermore, in the vicinity of the cutting end point or a corner section in which a deviation in heat input is likely to occur, as a heat input amount is reduced and a cutting speed is decreased, occurrence of scratching can be suppressed and high-quality cutting can be performed.

In consideration of the above-mentioned circumstances, the present invention is directed to provide a laser cutting method and a laser cutting device capable of suppressing the occurrence of scratching in a desired machining shape and enabling efficient cutting at a desired position of a cutting trajectory as well as a cutting end point when a workpiece such as a steel plate or the like is laser-cut.

Means for Solving the Problem

A laser cutting method according to a first aspect of the present invention is a laser cutting method of injecting a cutting gas while radiating a laser beam from a laser nozzle with respect to a workpiece, and moving the laser nozzle and the workpiece in relation to each other to cut the workpiece in a state in which an area of the workpiece irradiated with the laser beam is covered with the cutting gas. Then, based on a material and a plate thickness of the workpiece, a steady oxygen concentration contained in the cutting gas when steady cutting is performed with respect to the workpiece, a steady relative moving speed of the workpiece and the laser nozzle when the steady cutting is performed with respect to the workpiece, and laser beam steady control conditions when the steady cutting is performed with respect to the workpiece based on laser beam control conditions including a frequency, a duty, a peak or average output of the laser beam are set. Further, when the laser nozzle arrives at a first setting position located in front of an end point of a cutting trajectory or a corner section, a relative moving speed of the workpiece and the laser nozzle is decreased to a first setting speed which is less than the steady relative moving speed; and when the laser nozzle arrives at a second setting position which is closer to the end point or the corner section than the first setting position, heat input to the workpiece is decreased by varying at least one of the oxygen concentration of the cutting gas and the control condition of the laser beam, and the relative moving speed of the workpiece and the laser nozzle is decreased to a second setting speed corresponding to the heat input to the workpiece, which is less than the first setting speed.

According to a second aspect of the present invention, in the laser cutting method according to the first aspect of the present invention, when the laser nozzle arrives at a third setting position which is closer to the end point or the corner section than the second setting position, the heat input to the workpiece is reduced by decreasing the frequency included in the laser beam control conditions.

A laser cutting device according to a third aspect of the present invention is a laser cutting device capable of cutting a workpiece by covering a laser beam radiated from a laser nozzle with a cutting gas and moving the laser nozzle with respect to the workpiece. The laser cutting device includes the laser nozzle configured to radiate the laser beam with respect to the workpiece and inject the cutting gas around the laser beam; a laser oscillator configured to generate the laser beam; a gas supply unit configured to adjust a concentration of oxygen contained in the cutting gas and supply the cutting gas in which the oxygen concentration is adjusted; a nozzle holding unit configured to hold the laser nozzle; a moving means configured to move the nozzle holding unit and the workpiece in relation to each other; and a control unit. While the control unit is configured to set a material, a plate thickness, and a cutting trajectory of the workpiece; based on the material and the plate thickness of the workpiece, the control unit sets a steady oxygen concentration of the cutting gas when steady cutting is performed with respect to the workpiece, a steady relative moving speed of the workpiece and the laser nozzle when the steady cutting is performed with respect to the workpiece, and laser beam steady control conditions when the steady cutting is performed with respect to the workpiece based on laser beam control conditions including a frequency, a duty, a peak or average output of the laser beam; when the laser nozzle arrives at a first setting position located in front of an end point of a cutting trajectory or a corner section, the control unit decreases the relative moving speed of the workpiece and the laser nozzle to a first setting speed less than the steady relative moving speed; and when the laser nozzle arrives at a second setting position which is closer to the end point or the corner section than the first setting position, the control unit decreases heat input to the workpiece by varying at least one of the oxygen concentration of the cutting gas and the control condition of the laser beam, and decreases the relative moving speed of the workpiece and the laser nozzle to a second setting speed corresponding to the heat input to the workpiece, which is less than the first setting speed.

According to a fourth aspect of the present invention, in the laser cutting device according to the third aspect of the present invention, when the laser nozzle arrives at a third setting position which is closer to the end point or the corner section than the second setting position, the control unit decrease the frequency include in the laser beam control conditions.

According to the above-mentioned laser cutting method and the laser cutting device of the present invention, when the laser nozzle arrives at the first setting position located in front of the end point of the cutting trajectory or the corner section, the relative moving speed of the workpiece and the laser nozzle is decreased from the steady relative moving speed to the first setting speed. For this reason, a drag in which a delay is reduced can be generated, and as a result, the workpiece can be stably cut and occurrence of scratching can be suppressed.

In addition, when the laser nozzle arrives at the second setting position, at least one of the oxygen concentration of the cutting gas and the control condition of the laser beam is varied. For this reason, when the oxygen concentration is decreased, even when the remaining margin between a cutting front and an already formed kerf is reduced, self burning due to heat generated by the laser cutting is suppressed. As a result, an excessive increase in the temperature of the remaining margin and abrupt melting can be suppressed to form a laser cutting hole with high efficiency.

In the specification, the cutting gas includes both of an assist gas and a mixed gas of a shield gas and the assist gas.

In addition, in the specification, the steady relative moving speed is a speed set based on the material and the plate thickness of the workpiece. In addition, the first setting speed is a speed provided to reduce a delay of the drag to a speed less than the steady relative moving speed and generate the drag to approach in a plate thickness direction.

In addition, in addition to properties such as a composition, ingredients, and so on, a material of the workpiece includes configurations such as surface properties, a clad structure in which different kinds of materials are sandwiched or presence of the different kinds of materials in a surface direction of a workpiece, an inner cavity, and so on.

Further, the first setting speed and the second setting speed are speeds set with a width based on, for example, the material of the workpiece, the purity of the oxygen used, and so on. That is, the first setting speed and the second setting speed are set with reference to a steady relative moving speed based on the material and the plate thickness of the actual cutting area rather than the steady relative moving speed upon starting of the cutting.

In addition, in the specification, the corner section refers to an area at which a direction of the kerf is converted via a curved line (R) or bending.

According to the above-mentioned laser cutting method and the laser cutting device of the present invention, when the laser nozzle arrives at the third setting position, as the frequency included in the laser beam control conditions is decreased, expansion of the melting range from the workpiece upper surface is suppressed, and scratching due to the abrupt melting does not easily occur even when the remaining margin is reduced.

Effects of the Invention

According to the above-mentioned laser cutting method and laser cutting device, in the vicinity of the end point of the laser cutting and the corner section, it is possible to suppress the occurrence of abrupt melting due to excessive heating of the remaining margin, and suppress the occurrence of scratching in the workpiece.

BRIEF DESCRIPTION OF INVENTION

DESCRIPTION OF EMBODIMENTS

Hereinafter, an embodiment of the present invention will be described with reference to the accompanying drawings.

Figure 1:
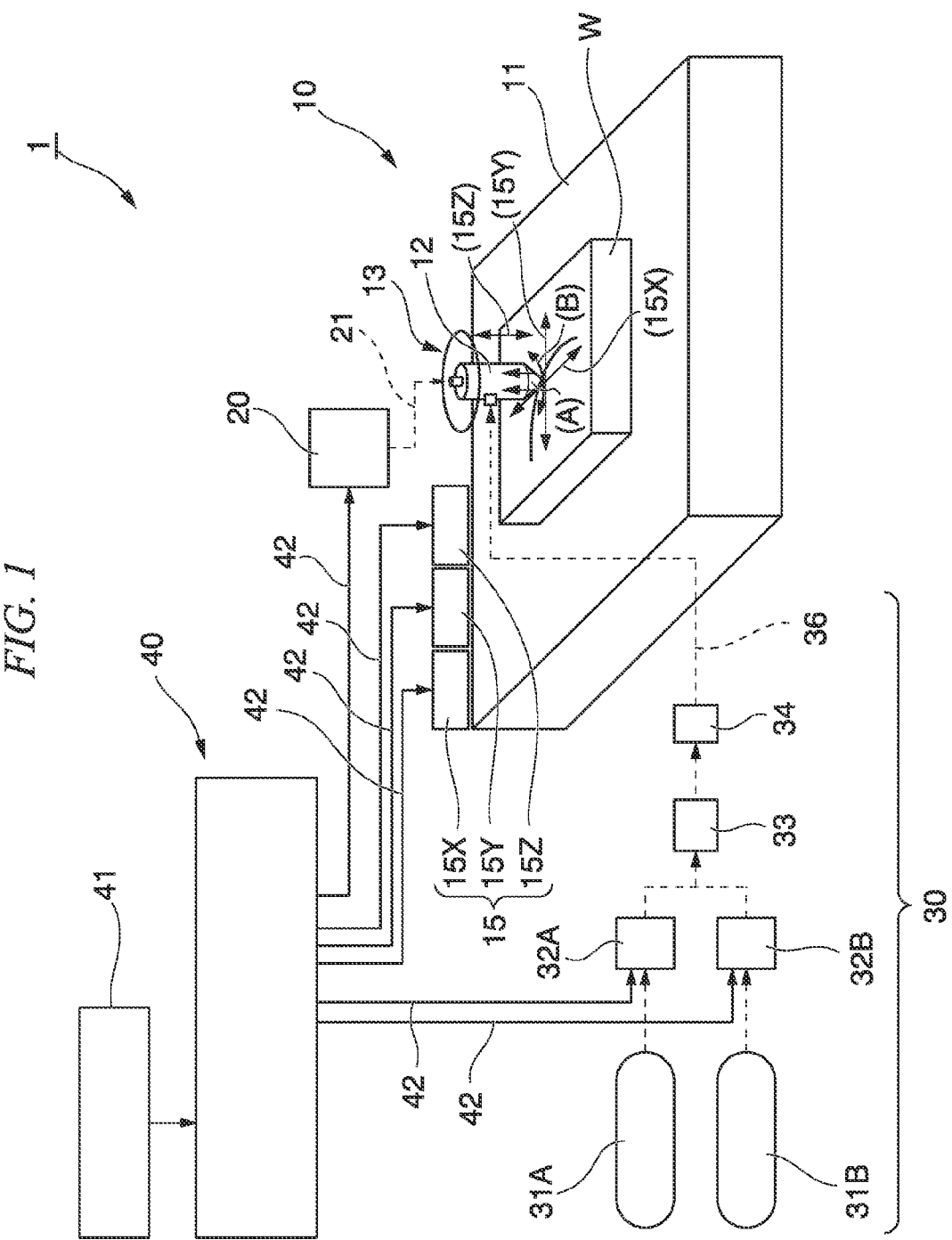
FIG. 1 is a view showing a schematic configuration of a laser cutting device according to an embodiment of the present invention.

FIG. 1 is a view schematically showing a laser cutting device according to an embodiment of the present invention. Reference numeral 1 designates the laser cutting device.

The laser cutting device 1 includes a laser machining apparatus main body 10, a laser oscillator 20, a gas supply unit 30, and a control unit 40. The workpiece W is covered with a cutting gas injected from the gas supply unit 30 while a laser beam is radiated to a workpiece W by a laser nozzle 12 installed at the laser machining apparatus main body 10, and the workpiece W is cut by moving the laser nozzle 12 with respect to the workpiece W.

The laser machining apparatus main body 10 includes, for example, a surface plate 11 on which the workpiece W is placed, the laser nozzle 12, a nozzle holding unit 13 configured to hold a nozzle hole of the laser nozzle 12 toward a predetermined position of the workpiece W, and a moving means 15 configured to move the nozzle holding unit 13 with respect to the surface plate 11 with the laser nozzle 12.

The laser nozzle 12, for example, includes a laser nozzle main body formed in a tubular shape. Laser beams transmitted from the laser oscillator 20 are condensed by a beam condensing lens disposed at a base end section of the laser nozzle main body to be radiated from a hole of a laser nozzle distal end to the workpiece W, the cutting gas supplied from the gas supply unit 30 is injected from the above-mentioned hole to a periphery of the laser beam, and a machining point of the workpiece W is covered therewith.

The nozzle holding unit 13 is a member configured to hold the laser nozzle 12 toward a predetermined area of the workpiece W. The nozzle holding unit 13 is vertical and perpendicular to, for example, a surface of the surface plate 11, and is configured to be rotatable in an A surface parallel to an XZ surface constituted by an X axis and a Z axis, which will be described below, and a B surface parallel to a YZ surface. Further, for example, a known nozzle holding unit configured to turn and incline the laser nozzle 12 to direct the distal end of the laser nozzle 12 toward a predetermined area of the workpiece W may be applied as the nozzle holding unit 13.

The moving means 15 includes an X-axis (travel motion) direction moving means 15X, a Y-axis (transverse motion) direction moving means 15Y, and a Z-axis (height) direction moving means 15Z, which are mutually orthogonal. The moving means 15 moves the laser nozzle 12 with respect to the workpiece W with the nozzle holding unit 13 according to a signal from the control unit 40.

In the embodiment, the laser oscillator 20 generates a pulse laser beam. The generated laser beam is transmitted to the laser nozzle 12 through an optical path apparatus 21 and a beam condensing apparatus (not shown).

In addition, the laser oscillator 20 can adjust laser beam control conditions constituted of an average output, a frequency, and a duty according to a control signal from the control unit 40.

The gas supply unit 30 includes an oxygen supply source 31A, a nitrogen gas supply source 31B, a mass flow controller 32A corresponding to the oxygen supply source 31A, a mass flow controller 32B corresponding to the nitrogen gas supply source 31B, a mixer 33, a pressure regulation valve 34, and a gas piping 36. A flow rate of oxygen transmitted from the oxygen supply source 31A to the mixer 33 is adjusted by the mass flow controller 32A to mix oxygen and nitrogen gases to adjust an oxygen concentration of the cutting gas, and the cutting gas, a pressure of which is adjusted by the pressure regulation valve 34, is transmitted to the laser nozzle 12 via the gas piping 36.

The control unit 40 includes an input unit 41. Machining conditions such as a cutting trajectory, a shape of a cutting surface, and a material and a plate thickness of the workpiece W, and so on, can be input from the input unit 41. In addition, the control unit 40 is electrically connected to the moving means 15, the laser oscillator 20 and the gas supply unit 30 by a cable 42. A signal can be output from the control unit 40 with respect to the moving means 15, the laser oscillator 20 and the gas supply unit 30 via the cable 42.

In addition, the control unit 40 calculates a position of the laser nozzle 12 according to X-Y coordinates, a direction and a height of the laser nozzle 12, a steady moving speed (a steady relative moving speed) V0 when steady cutting is performed with respect to the workpiece W, a steady oxygen concentration contained in the cutting gas, and laser beam steady control conditions (an average output, a frequency, and a duty) based on the cutting trajectory, the shape of the cutting surface, and the material and plate thickness of the workpiece W input from the input unit 41, and outputs signals related to movement and position control of the laser nozzle 12 to the nozzle holding unit 13 and the moving means 15. Further, the control unit 40 outputs signals related to the laser beam steady control conditions and an oxygen concentration of the cutting gas with respect to the laser oscillator 20 and the gas supply unit 30. Furthermore, the material and the plate thickness of the workpiece W, a corresponding steady moving speed V0, a steady oxygen concentration of the cutting gas, and the laser beam steady control conditions are calculated with reference to, for example, a data table stored in the control unit 40.

In addition, the control unit 40 according to the embodiment is configured to adjust the moving speed of the laser nozzle 12, the oxygen concentration of the cutting gas and the laser beam control conditions and suppress occurrence of scratching at a cutting end point or a corner section of the workpiece W when the laser nozzle approaches either of an end point of the cutting trajectory or the corner section.

Next, suppression of occurrence of scratching at the cutting end point or the corner section of the workpiece W by the control unit 40 will be described with reference to FIG. 2.

Figure 2:
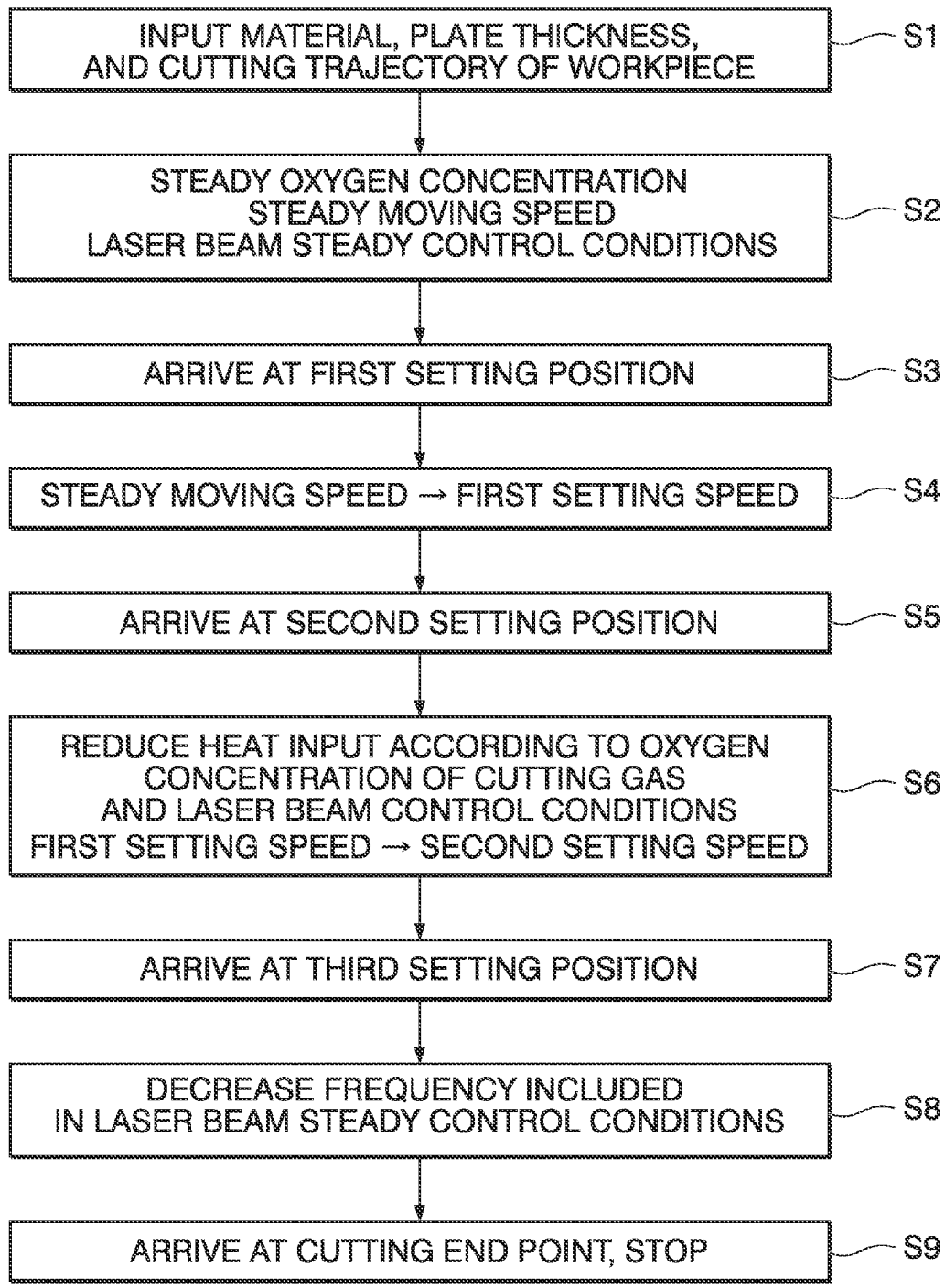
FIG. 2 is a schematic block diagram for describing an operation of the laser cutting device according to the embodiment of the present invention.

FIG. 2 is a schematic block diagram for describing operation control of the laser nozzle 12 by the control unit 40.

(1) First, the material, the thickness and the cutting trajectory of the workpiece W are input to the control unit 40 via the input unit 41 (S1).

(2) The control unit 40 sets a steady oxygen concentration of the cutting gas, the steady moving speed V0 of the laser nozzle 12 and steady control conditions of a laser beam, and outputs a signal to the gas supply unit 30, the moving means 15 (the nozzle holding unit 13 according to necessity) and the laser oscillator 20 based on the material, the thickness and the cutting trajectory of the workpiece W, which are input, for example, with reference to the data table (S2).

(3) The control unit 40 moves the laser nozzle 12 based on the conditions set in S2 until the laser nozzle 12 arrives at a first setting position. When arrival at the first setting position is detected, the control unit 40 advances to S4 (S3).

(4) The control unit 40 outputs a signal to the moving means 15 to reduce a moving speed of the laser nozzle 12 from the steady moving speed V0 to a first setting speed V1 (S4).

(5) The control unit 40 moves the laser nozzle 12 based on the conditions set in S4 until the laser nozzle 12 arrives at a second setting position. When arrival at the second setting position is detected, the control unit 40 advances to S6 (S5).

(6) The control unit 40 outputs a signal to decrease the oxygen concentration of the cutting gas and a signal to reduce heat input by the laser beam control conditions to the gas supply unit 30 and the laser oscillator 20. Further, the control unit 40 outputs a signal to the moving means 15 to decrease a moving speed of the laser nozzle 12 from the first setting speed V1 to a second setting speed V2 (S6).

(7) The control unit 40 moves the laser nozzle 12 based on the conditions set in S6 until the laser nozzle 12 arrives at a third setting position. When arrival at the third setting position is detected, the control unit 40 advances to S8 (S7).

(8) The control unit 40 outputs a signal to decrease a frequency included in the laser beam control conditions with respect to the laser oscillator 20 (S8).

(9) The control unit 40 moves the laser nozzle 12 based on the conditions set in S8 until the laser nozzle 12 arrives at the cutting end point. When arrival at the cutting end point is detected, the control unit 40 terminates the laser cutting (S9).

Further, when the application target is the corner section rather than the cutting end point, the control unit 40 advances to S1 after S8 instead of advancing to S9.

Next, an action of the laser cutting device 1 according to the embodiment will be described with reference to FIG. 3.

Figure 3:
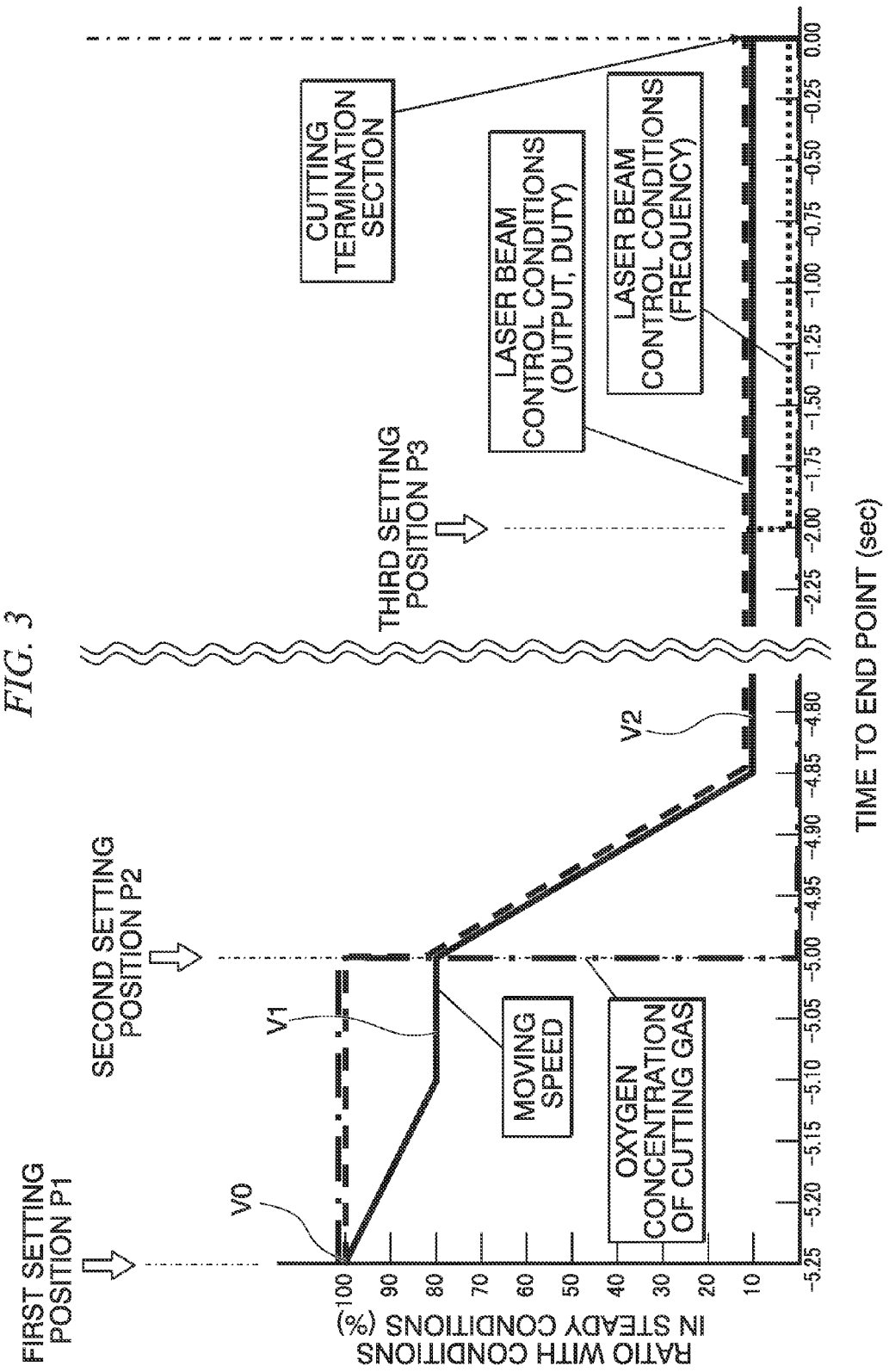
FIG. 3 is a schematic view showing an action of the laser cutting device according to the embodiment of the present invention.

Further, numerical values of a horizontal axis of FIG. 3 exemplify, for example, a route to the cutting end point in the cutting trajectory and a time to cutting termination calculated from the moving speed. Instead of a distance to the cutting end point, the control may be performed for a time to the cutting end point.

(1) The control unit 40 decreases the moving speed of the laser nozzle 12 to a predetermined speed (for example, 80%) when the laser nozzle 12 arrives at a first setting position P1 (for example, a remaining time to the cutting end point (hereinafter, the same as above) 5.25 sec). In addition, when the moving speed of the laser nozzle 12 is decreased to a predetermined speed, the control unit 40 moves the laser nozzle 12 while maintaining the moving speed until arrival at a second setting position P2 (for example, 5.0 sec).

(2) Next, the control unit 40 gradually decreases the moving speed of the laser nozzle 12 to a predetermined speed (for example, 10%) when the laser nozzle 12 arrives at the second setting position P2 (for example, 5.0 sec).

Here, the control unit 40 gradually decreases radiation conditions of the laser beam (output, a frequency and a duty) to predetermined radiation conditions (for example, 10% of a steady time with the output, the frequency and the duty). In addition, here, the control unit 40 decreases an oxygen mixing ratio of the cutting gas to a predetermined ratio (for example, 0%).

The control unit 40 moves the laser nozzle 12 while maintaining the moving speed and the radiation conditions until the laser nozzle 12 arrives at a third setting position P3 (for example, 2.0 sec) when the moving speed of the laser nozzle 12 and the radiation conditions of the laser beam are decreased to predetermined radiation conditions.

(3) Next, the control unit 40 decreases the frequency included in the radiation conditions (the output, the frequency and the duty) of the laser beam to a predetermined frequency (for example, several percent of the steady time) when the laser nozzle 12 arrives at the third setting position P3.

(4) Next, the control unit 40 stops movement of the laser nozzle 12 and radiation of the laser beam when the laser nozzle 12 arrives at the end point of the cutting trajectory.

Figure 4:
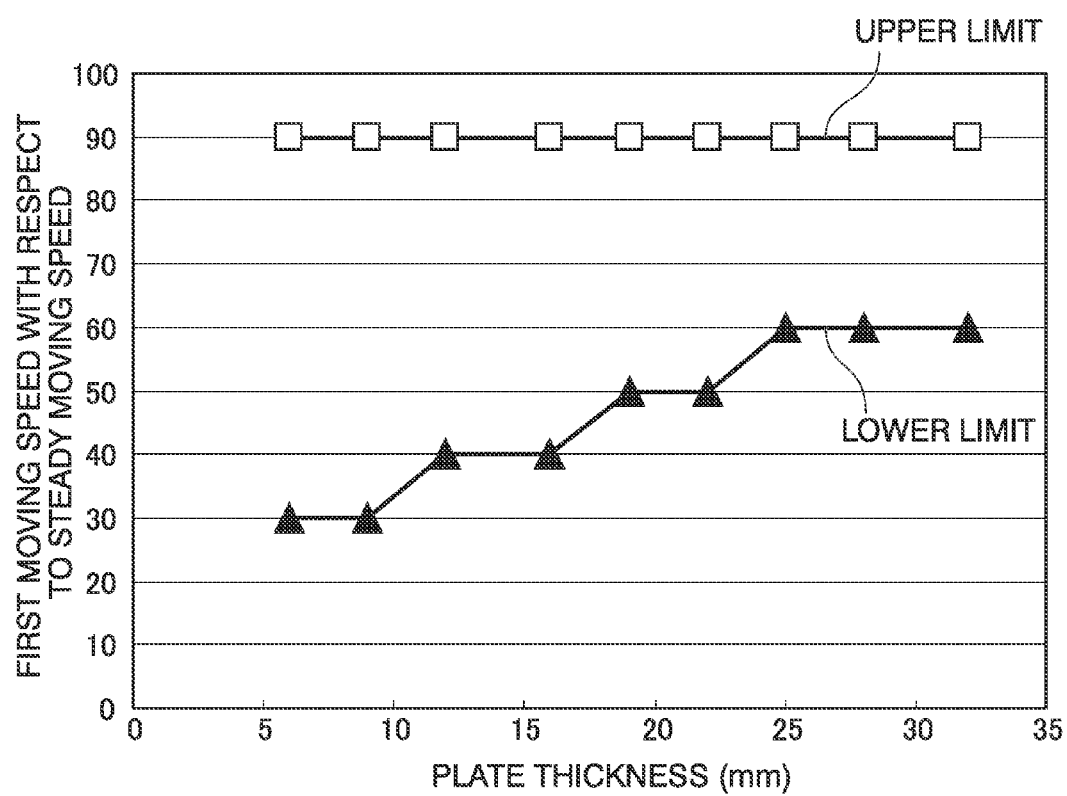
FIG. 4 is a view showing an effective range of a first moving speed of the laser cutting device according to the embodiment of the present invention.
Figure 5A:
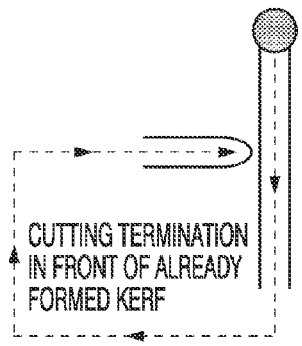
FIG. 5A is a view for describing a cutting method in the vicinity of a cutting end point in laser cutting of the related art.
Figure 5B:
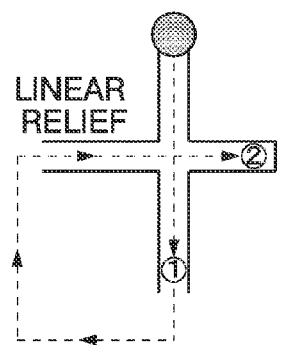
FIG. 5B is a view for describing the cutting method in the vicinity of the cutting end point in the laser cutting of the related art.
Figure 5C:
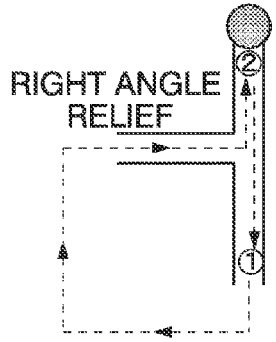
FIG. 5C is a view for describing the cutting method in the vicinity of the cutting end point in the laser cutting of the related art.
Figure 5D:
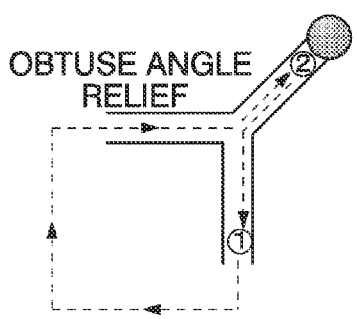
FIG. 5D is a view for describing the cutting method in the vicinity of the cutting end point in the laser cutting of the related art.
Figure 6A:
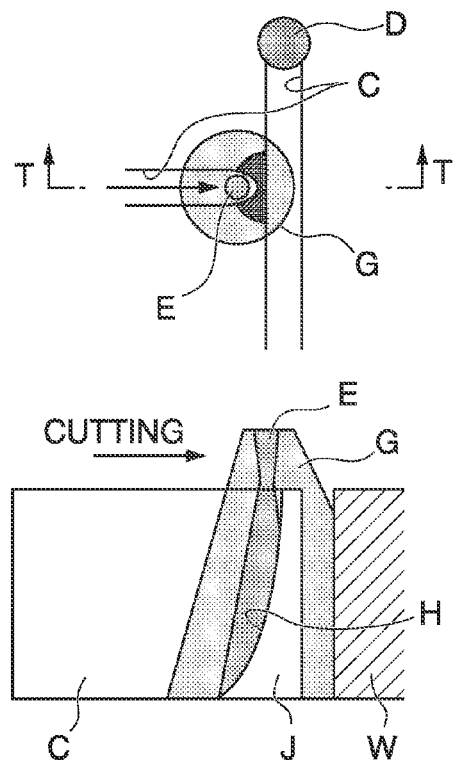
FIG. 6A is a view for describing causes of the occurrence of scratching when an area in the vicinity of the cutting end point is cut in the laser cutting of the related art.
Figure 6B:
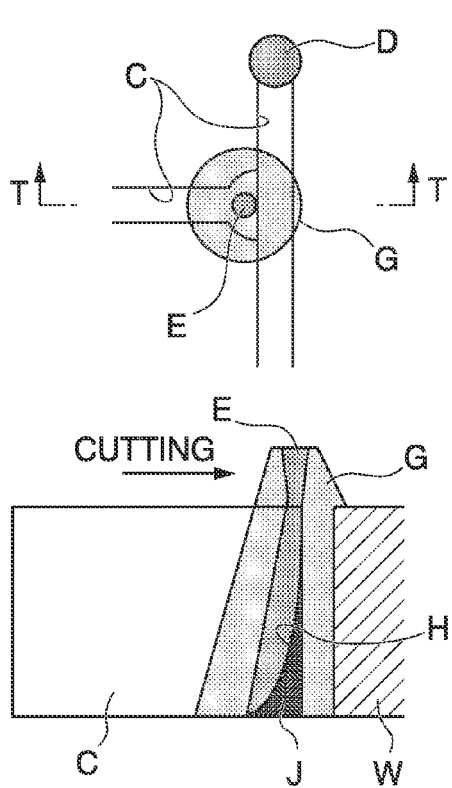
FIG. 6B is a view for describing causes of the occurrence of scratching when an area in the vicinity of the cutting end point is cut in the laser cutting of the related art.
Figure 6C:
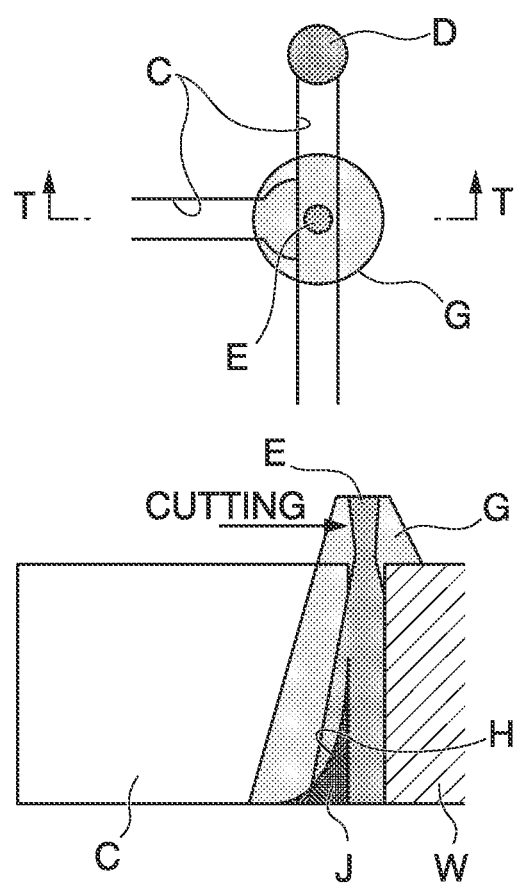
FIG. 6C is a view for describing causes of the occurrence of scratching when an area in the vicinity of the cutting end point is cut in the laser cutting of the related art.

Next, a range in which occurrence of scratching in the workpiece W according to a first embodiment is effectively suppressed will be described in particular with reference to FIG. 4. In FIG. 4, a horizontal axis represents a plate thickness (mm) of the workpiece W and a vertical axis shows a range of a first moving speed at which the occurrence of scratching is particularly effectively suppressed. In addition, Table 1 shows numerical value ranges showing upper limits and lower limits of the first setting speed V1 drafted based on FIG. 4.

According to FIG. 4, the lower limit of the first setting speed V1 is decreased as the plate thickness is reduced, and the lower limit of the first setting speed V1 is increased as the plate thickness is increased.

TABLE 1

| PLATE THICKNESS | VALID RANGE OF FIRST MOVING SPEED WITH RESPECT TO STEADY MOVING SPEED |
| --- | --- |
| 6 mm | 30%~90% |
| 9 mm | 30%~90% |
| 12 mm | 40%~90% |
| 16 mm | 40%~90% |
| 19 mm | 50%~90% |
| 22 mm | 50%~90% |
| 25 mm | 60%~90% |
| 28 mm | 60%~90% |
| 32 mm | 60%~90% |

According to the laser cutting device 1, when the laser nozzle 12 arrives at the first setting position, since the drag is generated as the moving speed of the laser nozzle 12 is decreased from the steady relative moving speed to the first setting speed V1, the abrupt melting at the lower side of the drag is suppressed and the occurrence of scratching is suppressed.

In addition, when the laser nozzle 12 arrives at the second setting position, since the oxygen concentration of the cutting gas and the control condition of the laser beam are varied while the laser nozzle 12 is decreased to the second setting speed, an excessive increase in temperature and the abrupt melting of the remaining margin can be suppressed and the workpiece can be cut by a small heat input. As a result, the occurrence of scratching in the vicinity of the cutting end point can be suppressed.

In addition, according to the laser cutting device 1, when the laser nozzle 12 arrives at the third setting position, the frequency included in the laser beam control conditions is decreased. For this reason, expansion of a melting range from the workpiece upper surface is suppressed, and occurrence of scratching due to the abrupt melting is suppressed even when the remaining margin is reduced.

In addition, when the steady moving speed V0 is decreased to the first setting speed V1, since the laser control conditions are not varied, a delay of the generation of the drag can be removed.

When the laser nozzle 12 arrives at the second setting position P2, as the oxygen concentration is decreased, self burning due to heat generated by the laser cutting is suppressed, and an excessive increase in temperature and occurrence of the abrupt melting of the remaining margin are suppressed. For this reason, the laser cutting hole can be formed with high efficiency.

In addition, in the vicinity of the cutting end point, as the frequency is decreased, the wide range of melting from the upper surface of the workpiece W in the vicinity of the end point is suppressed and the occurrence of scratching is suppressed.

In addition, when a speed region accompanying transition from the first setting speed V1, which is decreased 20% from the steady moving speed V0, to the second setting speed V2, which is decreased 80% from the steady moving speed V0, continues for a long time, the notch or the self burning is likely to occur even when the laser energy is controlled. However, the occurrence of the notch or the self burning can be suppressed by simultaneously performing a decrease in oxygen concentration of the cutting gas and a decrease in a laser beam control condition.

In addition, in the range in which the cutting speed is reduced 20% or more from the steady moving speed V0, excess of the laser energy and insufficient laser energy due to a variation in cutting speed can be suppressed by decreasing the laser beam control condition based on the change ratio of the cutting speed. In addition, the time from the first setting speed V1, which is decreased 20% from a steady movement speed, to the second setting speed V2, which is decreased 80% from the steady movement speed, can be reduced.

In addition, as the frequency of the laser beam in the vicinity of the cutting termination section is set to 10% or less of the steady frequency, the laser energy upon rushing into the already formed kerf can be controlled to suppress melting of the upper surface of the workpiece W.

Further, the present invention is not limited to the above-mentioned embodiment but various modifications may be made without departing from the scope of the present invention.

For example, in the above-mentioned embodiment, the case in which the laser beam control conditions are constituted by the frequency, the duty and the average output of the laser beam has been described. However, instead of the average output, a peak output of the laser beam may be applied.

In addition, in the above-mentioned embodiment, the case in which the first setting speed V1 is set to 80% of the steady moving speed V0 and the second setting speed V2 is set to 10% of the steady moving speed V0 has been described. However, the first setting speed V1 and the second setting speed V2 can be freely set within a range in which the abrupt melting can be suppressed.

In addition, the oxygen concentration of the cutting gas after arrival at the second setting position can be set to a concentration higher than 0%.

In addition, the average or peak output, the duty and the frequency according to the laser beam control conditions can be set to arbitrary numerical values.

In addition, in the above-mentioned embodiment, the case in which the workpiece W is a soft steel plate has been described. However, in addition to the soft steel plate, other metals such as stainless steel, aluminum, copper, titanium, and so on, or an alloy or a composite material thereof, may be applied as the workpiece W.

In addition, in the above-mentioned embodiment, the case in which both of the oxygen concentration of the cutting gas and the control condition of the laser beam are varied when the laser nozzle 12 arrives at the second setting position to reduce the heat input to the workpiece W has been described. However, at least one of the oxygen concentration of the cutting gas and the control condition of the laser beam may be varied.

In addition, in the oxygen supply source 31A and the nitrogen gas supply source 31B, liquid oxygen and liquid nitrogen, or compressed oxygen and nitrogen may be mixed as the cutting gas in the mixer 33. In addition, air may be used as some of a gas constituting the cutting gas. Instead of nitrogen, an inert gas, for example, argon, helium, or the like, may be used.

In addition, in the above-mentioned embodiment, while the case in which the laser nozzle 12 is moved with respect to the workpiece W has been described, for example, the workpiece W may be moved with respect to the laser nozzle 12. In addition, both of the laser nozzle 12 and the workpiece W may move in relation to each other.

INDUSTRIAL APPLICABILITY

According to the above-mentioned invention, occurrence of scratching in the workpiece in the vicinity of the cutting end point or the corner section can be suppressed.

REFERENCE SIGNS LIST

W workpiece
1 laser cutting device
12 laser nozzle
13 nozzle holding unit
15 moving means
20 laser oscillator
30 gas supply unit
40 control unit

The invention claimed is:

1. A laser cutting method of injecting a cutting gas while radiating a laser beam from a laser nozzle with respect to a workpiece, and moving the laser nozzle and the workpiece in relation to each other to cut the workpiece in a state in which an area of the workpiece irradiated with the laser beam is covered with the cutting gas, the laser cutting method comprising:

based on a material and a plate thickness of the workpiece, setting a steady oxygen concentration contained in the cutting gas when steady cutting is performed with respect to the workpiece, a steady relative moving speed of the workpiece and the laser nozzle when the steady cutting is performed with respect to the workpiece, and laser beam steady control conditions when the steady cutting is performed with respect to the workpiece based on laser beam control conditions including a frequency, a duty, and a peak or average output of the laser beam;

when the laser nozzle arrives at a first setting position located in front of an end point of a cutting trajectory or a corner section, decreasing a relative moving speed of the workpiece and the laser nozzle to a first setting speed which is less than the steady relative moving speed; and when the laser nozzle arrives at a second setting position which is closer to the end point or the corner section than the first setting position, decreasing heat input to the workpiece by varying at least one of the oxygen concentration of the cutting gas and the control condition of the laser beam, and decreasing the relative moving speed of the workpiece and the laser nozzle to a second setting speed, which is less than the first setting speed, corresponding to the heat input to the workpiece.

2. The laser cutting method according to claim 1, wherein, when the laser nozzle arrives at a third setting position which is closer to the end point or the corner section than the second setting position, the heat input to the workpiece is reduced by decreasing the frequency included in the laser beam control conditions.

3. A laser cutting device capable of cutting a workpiece by covering a laser beam radiated from a laser nozzle with a cutting gas and moving the laser nozzle with respect to the workpiece, the laser cutting device comprising:

the laser nozzle configured to radiate the laser beam with respect to the workpiece and inject the cutting gas around the laser beam;

a laser oscillator configured to generate the laser beam;

a gas supply unit configured to adjust a concentration of oxygen contained in the cutting gas and supply the cutting gas in which the oxygen concentration is adjusted;

a nozzle holding unit configured to hold the laser nozzle;

a moving means configured to move the nozzle holding unit and the workpiece in relation to each other; and a control unit, wherein, while the control unit is configured to set a material, a plate thickness, and a cutting trajectory of the workpiece, based on a material and a plate thickness of the workpiece, the control unit is configured to set a steady oxygen concentration contained in the cutting gas when steady cutting is performed with respect to the workpiece, a steady relative moving speed of the workpiece and the laser nozzle when the steady cutting is performed with respect to the workpiece, and laser beam steady control conditions when the steady cutting is performed with respect to the workpiece based on laser beam control conditions including a frequency, a duty, and a peak or average output of the laser beam;

when the laser nozzle arrives at a first setting position located in front of an end point of a cutting trajectory or a corner section, the control unit decreases a relative moving speed of the workpiece and the laser nozzle to a first setting speed less than the steady relative moving speed; and when the laser nozzle arrives at a second setting position which is closer to the end point or the corner section than the first setting position, heat input to the workpiece is decreased by varying at least one of the oxygen concentration of the cutting gas and the control condition of the laser beam, and the relative moving speed of the workpiece and the laser nozzle is decreased to a second setting speed, which is less than the first setting speed, corresponding to the heat input to the workpiece.

4. The laser cutting device according to claim 3, wherein, when the laser nozzle arrives at a third setting position which is closer to the end point or the corner section than the second setting position, the control unit reduces the heat input to the workpiece by decreasing the frequency included in the laser beam control conditions.

* * * * *